United States Patent

Hurst

[15] 3,684,826

[45] Aug. 15, 1972

[54] SYSTEM FOR RECORD MEDIUM CONTROL AND EDITING

[72] Inventor: Robert Norman Hurst, Cherry Hill, N.J.

[73] Assignee: RCA Corporation

[22] Filed: Jan. 29, 1970

[21] Appl. No.: 6,905

[30] Foreign Application Priority Data

March 21, 1969 Great Britain..........14,948/69

[52] U.S. Cl..........178/6.6 P, 178/5.4 CD, 178/6.6 A, 178/69.5 F, 179/100.2 S, 340/174.1 G

[51] Int. Cl.........G11b 5/06, G11b 15/52, H04n 5/78

[58] Field of Search.........178/6.6 A, 6.6 P, 5.4 CD, 69.5 F, 179/100.2 S; 340/174.1 G

[56] References Cited

UNITED STATES PATENTS

| | | | |
|---|---|---|---|
| 3,017,462 | 1/1962 | Clark | 178/69.5 F |
| 3,440,340 | 4/1969 | Sugihara | 178/5.4 CD |
| 3,048,831 | 8/1962 | Sharp | 340/174.1 G |
| 3,277,246 | 10/1966 | Altonji | 179/100.2 S |

*Primary Examiner*—Howard W. Britton
*Attorney*—Edward J. Norton and James B. Hayes

[57] ABSTRACT

A technique is disclosed for alleviating problems in manually and/or electronically splicing and editing video information on a record medium utilized in recorder-reproducer systems. The technique solves the dilemma between making the edit pulse rate low enough to define color frame rate, and making the edit pulse rate high enough for rapid capstan lock up. To accomplish this, dual frequency information which may take the form of the alternation of single pulses and pulse doublets on the control track is utilized.

8 Claims, 3 Drawing Figures

INVENTOR.
ROBERT N. HURST
BY James B. Hayes
ATTORNEY

INVENTOR.
ROBERT N. HURST
BY James B. Hayes
ATTORNEY

SYSTEM FOR RECORD MEDIUM CONTROL AND EDITING

When television tape recording was first standardized, pulses were put on the control track to mark the places to cut the tape for splicing. These pulses, which were 30 Hz pulses for American television and 25 Hz pulses in Europe, showed the place to cut the tape to make proper splices. This pulse rate was adequate for monochrome television because a complete monochrome television picture occurs every one-thirtieth of a second (one twenty-fifth of a second in Europe.)

Having placed these pulses on the control track at 30 Hz for editing purposes, it was only natural that the designers would find other uses for them. It was soon shown that capstan lock-up could be improved if the control track pulses were used to drive the capstan in its initial lock-up cycle.

The above state of affairs was adequate for monochrome television, but with the advent of color a new problem arose. Color television pictures effectively occur at the rate of one picture every one-fifteenth of a second; that is, at one half the rate of monochrome pictures. Correct editing and splicing of color video tape recordings, whether done mechanically or electronically, requires that there be 15 Hz information available.

Since these same editing pulses are used to initiate the lock-up of the capstan servo, alteration of the edit pulse rate causes the capstan servo lock-up time to be changed. The change in lock-up time might be expected to be in the same ratio as the change in the edit pulse rate. However it has been found, that a decrease of the edit pulse rate to 15 Hz increases the lock-up time by about 20 percent. While this increase is undesirable, it may be tolerable.

However, there is yet another problem caused by the introduction of 15 Hz pulses on the control track. Specifically, a man doing manual editing is no longer able to make a splice as accurately as he was with the 30 Hz pulses. That is, he cannot locate that spot on the tape where he would like to splice with as much resolution.

The need for all the foregoing arises from the fact that, in the NTSC color television system two successive frames may be identical from a monochrome viewpoint, but the color subcarrier contained in these two successive frames is shifted 180° in frame two, as compared to frame one. In frame three, another 180° reversal takes place, making frame three identical to frame one. Similarly frame four is identical to frame two. Therefore effectively, two complete monochrome frames must be transmitted before it can be said that one complete color frame has been transmitted. This arrangement was adequate until video tape recording was developed. With tape recording, it is possible to splice frame two directly to frame four, which is perfectly acceptable for monochrome, but causes a 180° discontinuity in the color information. The playback of a single splice of this nature causes a shift in the apparent monochrome timing. This effect is objectionable, but tolerable except in exacting applications. However, when a series of rapid splices are made, such as is found in animation or other special affects, the random phase reversals of subcarrier cause the machine to be incapable of replaying the tape correctly.

In Europe the problem has yet another dimension. The choice of PAL by the Europeans for their color television system, caused them to have an effective base color frame repetition rate of one quarter the monochrome repetition rate. Consequently, the proper analogous rate for control track edit pulses in Europe would not be 12½ Hz, but rather 6¼ Hz. In the PAL color television system used in Europe, an additional alternation is put into the signal in the form of a phase alternation on a line-to-line basis. Without this phase alternation, frames 1, 3, 5 etc. would be identical, as in the NTSC system. But with the phase alternation on the lines, the corresponding lines of the fields are reversed by the phase alternation. Therefore the identical frames in a PAL color television system are frames 1, 5, 9 etc. In other words, effectively four complete monochrome frames must be transmitted in order to arrive at an identical color television frame. Since the monochrome frame rate is 25 frames per second, the basic color frame rate is 6¼ frames per second. This second halving of the edit pulse rate takes the problem beyond the threshold of acceptibility. A European capstan servo fed a 6¼ Hz edit pulse takes an intolerably long time to lock-up, if indeed it will lock up at all. The resulting dilemma is of serious magnitude. The pulse rate must be equal to the color television frame rate in order that splicing may be done correctly. Yet, the edit pulse rate must not fall below a certain value, if the other considerations are to be preserved.

It is therefore an object of the invention to provide an apparatus which enables accurate editing of video information while retaining rapid lock-up of the record medium drive capstan in applications as described above.

Briefly the system includes a recorder reproducer having means for transducing to and from a record medium a video signal including a plurality of information frames. Additional transducing means are provided for transducing with the medium at least one other signal. There is also provided means for controlling the transducing means and an arrangement for moving the record medium relative to the transducing means. Means are present for generating and applying to the additional transducing means, a composite pulsed control signal having dissimilar pulse components. Each of the components define different ones of the video frames. Further means are coupled to the additional transducing means to provide a further control signal in response to certain ones of the components of the composite control signal recovered from the record medium.

Figure 1:
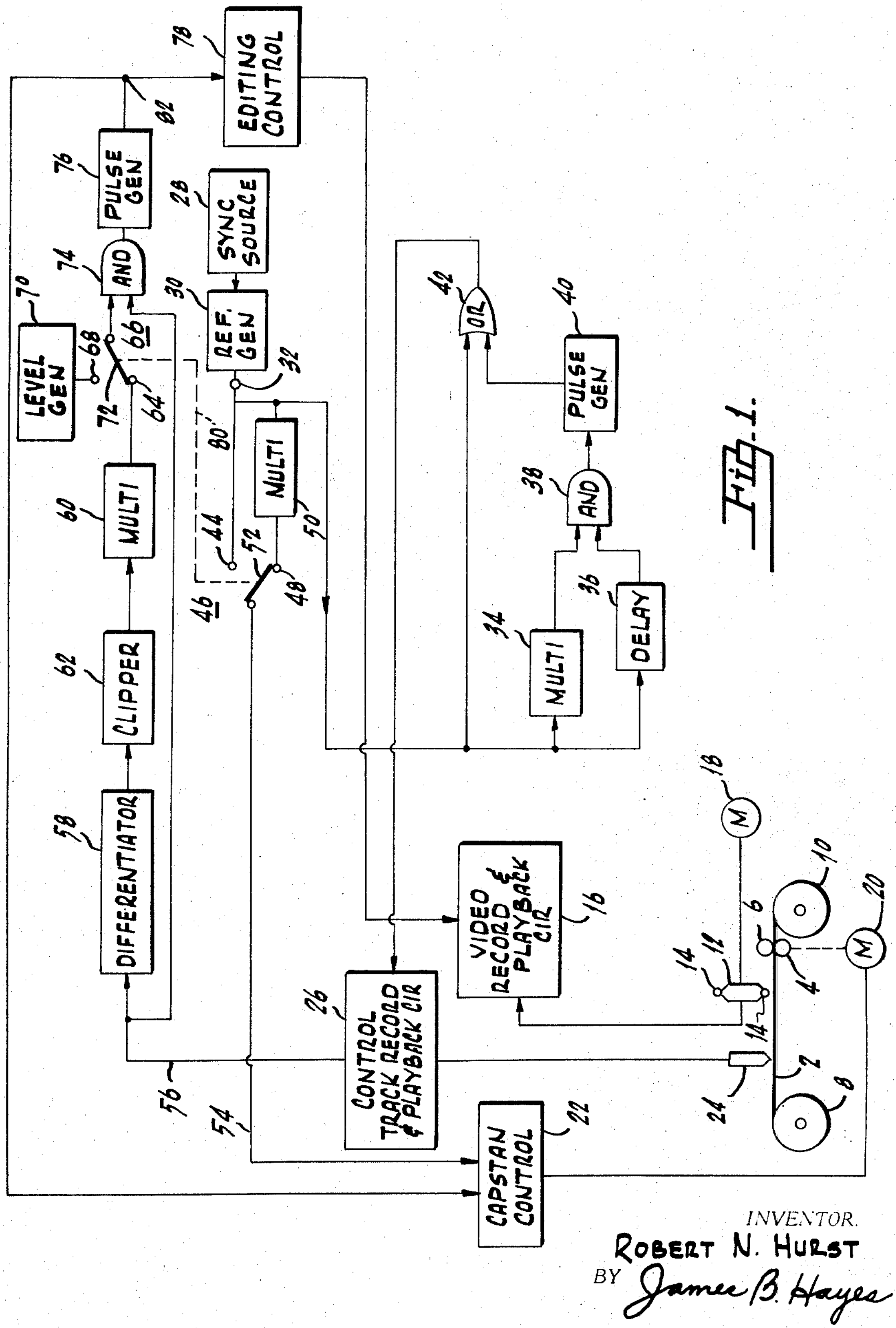
FIG. 1 is a diagrammatic view in block form of an embodiment of the invention.

In FIG. 1 there is shown in simplified form, a recorder-reproducer system embodying the invention. In FIG. 1 a record medium 2 is driven for example, by the cooperative arrangement of a capstan 4 and a pinch roller 6. The record medium 2 may be arranged in an endless loop (not shown) or between suitable supply 8 and takeup reels 10 may be provided. A headwheel 12 is provided and mounted for rotation in a plane perpendicular to the direction of movement of the medium 2.

The headwheel 12 preferably has magnetic transducing heads 14 spaced about the periphery thereof. The magnetic heads 14 engage the record medium 2 in turn, thereby scanning in time sequence across the width of the medium 2. The signals recorded and reproduced from the medium 2 by the heads 14 are processed by the record and playback circuitry 16, details of which are well known and therefore need not be discussed here. A motor 18 is coupled to the headwheel 12 for providing controlled rotation thereof. The capstan 4 is rotated by the motor 20 which is energized and controlled by the circuitry of block 22. Again the capstan lock-up and control circuitry 22 are known in the art and details thereof need not be discussed here. Also mounted in transducing relation with the medium 2 is a control track transducing head 24. The head 24 is utilized to record and playback control information on the medium 2. The head 24 may be arranged to provide a longitudinal track along an edge of the medium 2. Signals transduced by the head 24 are interfaced with known control track record and playback circuitry of block 26.

Also shown in FIG. 1 is a sync source 28 which provides a video synchronizing signal which corresponds to so called house sync or is derived from video to be recorded. The sync source 28 feeds a reference generator 30 which provides reference or frame pulses at a rate such as 30 Hz on terminal 32. Terminal 32 is coupled to the input of multivibrator circuitry 34 and a delay means 36. Circuitry 34 is preferably a bistable or flip-flop circuit. The delay means 36 is preferably a one shot or monostable multivibrator. The outputs of circuitry 34 and 36 form two inputs to AND-gate 38. The output of gate 38 is coupled through a pulse generator 40, which is preferably a one shot multivibrator, to one input of OR-gate 42. A second input to gate 42 is provided from terminal 32. The output of gate 42 is fed to the control track record and playback circuitry 26.

Terminal 32 is also coupled to a contact 44 of switch 46. The terminal 32 is further coupled to contact 48 of switch 46 through a multivibrator circuitry 50. The circuitry 50 is preferably arranged as a divide by two circuit to provide 15 Hz pulses at contact 48. The wiper 52 of switch 46 provides a selectable rate reference to capstan control circuitry 22 on lead 54.

An output lead 56 from control track circuitry 26 is coupled to the input of differentiator circuitry 58. The output of circuitry 58 is coupled to a multivibrator 60 through clipper circuitry 62. The circuit 60 is preferably a mono-stable or one shot multivibrator. The output of circuitry 60 is fed to contact 64 of switch 66. The contact 68 of switch 66 is coupled to a level generator 70. The wiper 72 of switch 66 is coupled to a first input of AND-gate 74. A second input to gate 74 is provided on lead 56. The output of gate 74 is coupled to a pulse generator 76. The pulse generator 76 is again preferably a one shot or mono-stable multivibrator circuitry. The generator 76 output is coupled as a second input to capstan control circuitry 22. The generator 76 output is also coupled through editing control circuitry 78 to the video record and playback circuitry 16. The editing control 78 contains known means which cooperate with the balance of the recorder-reproducer system for performing various operations such as splices, edits and annimation of the record medium 2 video.

The wiper 52 of switch 46 and the wiper 72 of switch 66 are arranged to be simultaneously operated, as indicated by the dashed line 80, by suitable manual or automatic control means not shown.

In the operation of the system of FIG. 1, the 30 Hz frame pulses from reference generator 30 are fed directly to gate 42. The frame pulses are also fed to the clock input of bistable multivibrator 34, causing it to produce a 15 Hz square wave at its output as indicated by waveform B of FIG. 2. The frame pulses are also fed to delay means 36 which as indicated may be a one shot delay multivibrator, whose time delay is equal to the desired delay between the leading edges of a pulse doublet to be produced. The output of delay means 36 is used to trigger generator 40, which makes the second pulse of the doublet. However, in order to trigger generator 40, the trigger pulse must pass through AND-gate 38, which is turned on and off alternately by the output of multivibrator 34. Therefore, the second pulse of the doublet is made only when the multivibrator 34 output is high, thereby permitting the AND-gate 38 to conduct the trigger pulse to generator 40. The second pulse of the doublet is combined with the frame pulse from generator 30 in OR-gate 42, to provide the alternating pulse doublet output desired on the control track. This output is fed to the control track record and playback circuit 26 which provides the recording of the alternating single pulses and pulse doublets on the control track of medium 2 for utilization inplayback. The described waveform is shown in FIG. 2 as waveform C.

Figure 2:
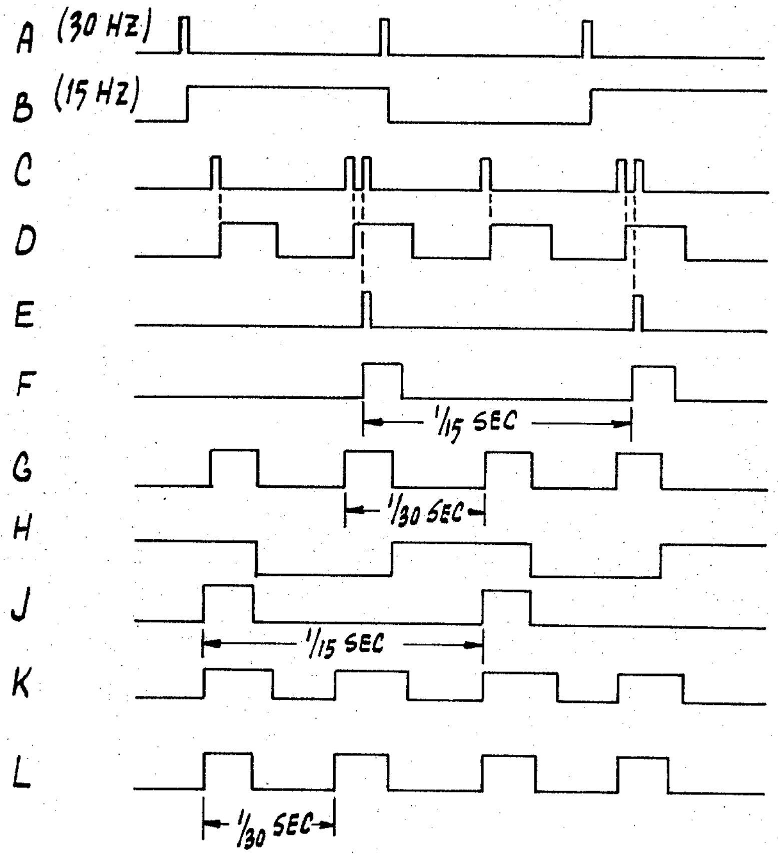
FIG. 2 is a series of waveforms useful in understanding the operation of the invention of FIGS. 1 and 3.

In playback, the pulse signal shown as waveform C of FIG. 2, recovered from the control track of the medium 2 by the head 24 and circuitry 26, is fed to the differentiator 58 and then to clipper 62, which preserves the trailing edges of the pulses. The trailing edges are used to trigger the multivibrator 60. As shown in waveform D of FIG. 2, the period of the multivibrator 60 may be made greater than the time between the doublet pulses, but less than the spacing between the single pulse and the first pulse of the doublet pulses. For example a satisfactory value in the American system is about one-sixtieth of a second.

When the switch 66 is in the position shown, the output of multivibrator 60 is fed to AND-gate 74. The other input of gate 74 is from the recovered control track pulses themselves. Since multivibrator 60 is triggered from the trailing edges of the input pulses, the singlet pulse will trigger the multivibrator 60 which may be made to hold open the AND-gate 74 for about half the period between pulses. Since no additional pulses occur during this interval, there will be not output from gate 74. However, when the first doublet pulse triggers multivibrator 60, it causes the AND-gate 74 to be held open during the second pulse of the doublet pair, and therefore allows it to pass. The output of gate 74 is therefore as shown in waveform E of FIG. 2. Therefore, the output of gate 74 is always the second pulse of the doublet. This output is caused to trigger generator 76 which produces an output, shown as waveform F of FIG. 2, which is timed with the second leading edge of the doublet. This output of generator 76, which is at 15 Hz, is utilized by the editing control circuitry 78 in cooperation with circuitry 16 for accurate frame location editing.

In a second playback operating mode of the arrangement of FIG. 1, wiper 72 of switch 66 is made to engage contact 68 while wiper 52 of switch 46 engages contact 44. The operation of this arrangement is as previously described, however, in this configuration the level generator 70 provides a level to one input of gate 74, which is operable to maintain gate 74 in a high or pass condition. The output of gate 74 therefore will be the same as the signal forming the second input to gate 74 on lead 56. In response to this condition, the generator 76 will produce a train of pulses one-thirtieth of a second apart, since the generator will be triggered on the occurrence of the leading edges of both the single pulse and the pulse doublet. To prevent the doublet pulse from causing generator 76 to trigger twice, the operating width of the generator 76 output may be made greater than the time spacing between the leading edges of the doublet pulses. The output of generator 76 for the described condition is shown as wave form G of FIG. 2. The output of generator 76 is fed to the capstan control 22 to provide 30 Hz information, for rapid lock up of the capstan which drives the medium 2.

It is also to be noted that when switch 46 engages contact 44, a reference signal from generator 30 is provided to the capstan control 22. The frequency of the reference signal is 30 Hz which is compatible with the information being provided the capstan control 22 from gate 76.

When switch 46 is in the position shown for the mode previously described, a 15 Hz reference signal from multivibrator 50 is provided to capstan control 22. The 15 Hz frequency of this reference signal is compatible with the information then being provided to the capstan control 22 from gate 76.

Figure 3:
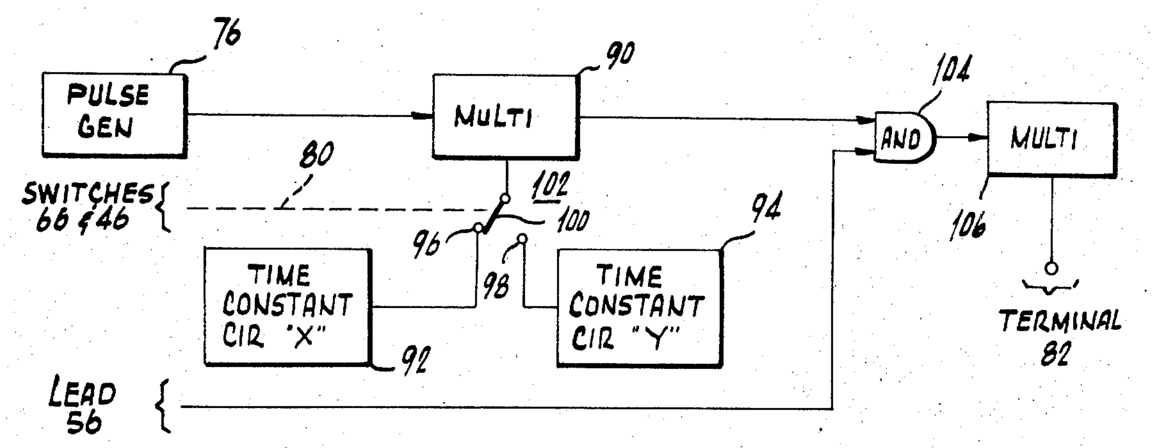
FIG. 3 is a diagrammatic view in block form of an alternate embodiment of the invention.

FIG. 3 shows an alternate arrangement of the invention for providing greater accuracy with the system of FIG. 1. For the arrangement of FIG. 3, the coupling between generator 76 and terminal 82 of FIG. 1, is removed and the elements shown in FIG. 3 are interposed. It will be understood that like reference characters in FIG. 3, relate to the corresponding elements shown and described for FIG. 1, and that the elements of FIG. 1 are utilized in the embodiment of FIG. 3 although not shown therein.

In FIG. 3, a multivibrator 90 has an input coupled to the output of generator 76. The circuitry 90 is preferably a one shot or monostable multivibrator with a controllable period. The time constant or period of multivibrator 90 is controllable by time constant circuits 92 and 94. The time constant circuits 92 and 94 are selectively coupled to multivibrator 90 through contacts 96, 98 and wiper 100 of switch 102. The wiper 100 of switch 102 is operated simultaneously with switches 46 and 66 of FIG. 1, by the dash line means 80.

The output of multivibrator 90 is coupled to one input of an AND-gate 104. A second input to the gate 104 is provided from lead 56. The output of gate 104 is coupled to a further multivibrator 106. The multivibrator 106 is preferably a one shot or monostable multivibrator. The output of multivibrator 106 is coupled through terminal 82 to succeeding circuitry as shown in FIG. 1.

With the arrangement of FIG. 3, the system operates as shown and described for FIG. 1, up to the output of pulse generator 76. In FIG. 3 the output of generator 76 feeds multivibrator 90 whose period is controlled by switch 102. When switch 102 is in the position shown, the circuit 90 is caused to produce a pulse width output which is greater than one-thirtieth of a second. This output of circuit 102, which is initiated by the trailing edge of the last pulse of the doublet, may be made to cause gate 104 to be held open past the occurrence of the next single pulse. This can be observed from a consideration of waveforms H and C of FIG. 2. The AND-gate 104, which is coupled to the recovered control track pulses on lead 56, therefore passes the single pulse, causing multivibrator 106 to produce a more accurate output (waveform J of FIG. 2), which is timed with the leading edge of the single pulse.

When the wiper 100 of switch 102 engages contact 98, the period of multivibrator 90 is made smaller by operation of the circuit 94. The value of the time constant is made to ensure that multivibrator 90 triggers reliably at a 30 Hz rate as shown in waveform K of FIG. 2. For this condition the recovered pulses on lead 56 are passed directly to multivibrator 106. The period of multivibrator 106 may be made sufficiently long to prevent double triggering on the pulse doublet. The output of multivibrator 106 which is a 30 Hz pulse train is shown as waveform L of FIG. 2.

Thus a system has been provided wherein both 15 Hz and 30 Hz information, such as described, can be recorded and recovered from a record medium. The recovered information may then be processed as shown and described to selectively provide rapid lock up of the capstan drive or accurate frame location for such operations as editing, splicing and animation.

An additional advantage of the described technique is that the control information recording on a record medium tape, will contain information which will become visible by the use of carbonyl iron suspension, commonly known as Visimag. The doublet pulse will be plainly visible and distinguishable from the neighboring single pulse. Therefore, an operator doing mechanical splicing may join two tapes, or may cut out sections of a single tape, and rejoin the result at precise color frame intervals. He may do this, for example, either by cutting both tapes at the doublet or at the singlet, as long as he is consistent in the location of cutting between the two tapes.

For purposes of explanation the invention has been discussed in terms of the NTSC American standards. However, it is to be understood that the invention is also applicable to other video systems and standards such as the European PAL system mentioned herein.

What is claimed is:

1. The combination with a recorder reproducer system for transducing with a record medium video information including a plurality of frames, said system further including means for recording on said medium a control track signal, and a pulsed reference signal source, the pulses of said reference signal being correlated to said video information frames, comprising:

second means coupled to said reference signal source for providing an output with a single pulse in response to certain ones of said reference pulses and pulse doublets in response to other ones of said reference pulses, said second means including third means responsive to said reference signal pulses for providing a train of pulses delayed from said reference pulses by a given amount, fourth means responsive to said reference signal pulses and the output of said third means for providing a signal comprising alternate output pulses of said third means, and fifth means for combining the output of said fourth means with said reference signal to provide from said second means said output with said single pulse and said pulse doublets, means for applying the output of said second means to said control track signal recording means.

2. The combination with a recorder reproducer system for transducing with a record medium video information including a plurality of frames, and means for playing back from said medium a control track signal recorded thereon, said control track signal having first and second dissimilar pulse components, each of said components defining different ones of said video information frames, said system further including means for controlling the transducing of said video and control track signals and means for providing controlled movement of said medium relative said signal transducing and playback means, comprising; further means coupled to said control track playback means and operable for providing in response to said dissimilar control track signal components, in a first mode thereof a first train of pulses corresponding to a first group of said video information frames, and in a second mode thereof providing a second train of pulses corresponding to a further group of said video information frames, said further group including the frames of said first group, and means for applying the output of said further means, to said video transducing control means during at least said first mode, and to said medium movement control means during at least said second mode.

3. The invention according to claim 2, and including a source of first and second pulsed frame reference signals, said first reference signal having substantially the frequency of the output of said further means in said first mode, with said second reference signal having substantially the frequency of the output of said further means in said second mode, and means for selectively applying to said medium movement control means said first reference signal when said further means is in its first mode and said second reference signal when said further means is in its second mode.

4. The invention according to claim 2, wherein said control track signal components include alternating single pulses and pulse doublets, said further means includes pulse generating means having a first input coupled to said control track signal playback means for providing an output from said control track signal in response to a second input to said pulse generating means, and means including switching for providing said second input to said pulse generating means to cause said generating means to provide a pulsed output timed with selected ones of said components of said control track signal.

5. The invention according to claim 4, wherein said further means includes second pulse generating means coupled to said first pulse generating means, said second pulse generating means including variable time constant means for altering the output period of said second pulse generating means in accordance with the mode of operation of said further means, third pulse generating means including second gating means for providing an output timed with portions of said control track signal in the presence of said output of said second pulse generating means.

6. In a recorder reproducer system including, means for providing controlled transducing with a record medium of a video signal having a plurality of information frames and means for providing controlled movement of said medium relative said transducing means, a method of selectively providing rapid lock up of said medium moving means or accurate location of said information frames, comprising the steps:

generating a composite pulse signal comprising an alternation of single pulse and pulse doublet components correlated to said information frames;

recording said composite signal on a control track of said medium in relation to said video signal;

recovering said composite signal from said medium;

generating a pulsed output signal in response to said recovered signal, said output in a first mode being timed with one of said components of said composite signal, and in a second mode said output being timed with both of said components of said composite signal; and applying said output signal to said medium movement control means and said transducing control means.

7. In a recorder reproducer system having, first means for transducing to and from a record medium a video signal including a plurality of information frames, second means for transducing with said medium at least one other signal, means for controlling the transducing of said first and second means and means for moving said medium relative to said transducing means, the combination comprising:

means for generating a composite control signal having first and second dissimilar components with said components being spaced in time by an interval related to the time interval between said video information frames;

means for applying said control signal to said second transducing means in a manner correlating the occurrence of said first and second components with different ones of said video information frames on said record medium;

further means coupled to said second transducing means and operable to recover said control signal from said record medium;

means coupled to said further means and responsive to said control signal for providing a first output comprising said first component of said control signal, and for providing a second output comprising said first and said second components of said control signal;

means for applying said first output to said transducing control means; and means for applying said second output to said record medium moving means.

8. In a playback system having first means for transducing from a record medium a video signal including a plurality of information frames, said record medium also having recorded thereon a control signal having first and second dissimilar components with said components being spaced in time by an interval related to the time interval between said video information frames, and said first and second of said control signal components being correlated with different ones of said video information frames on said medium, the combination comprising; further means including second transducing means for cooperating with said record medium to recover said control signal therefrom, means for controlling said first and second transducing means, means for moving said medium relative to said transducing means, means coupled to said further means and responsive to said control signal for providing a first output comprising said first component of said control signal, and for providing a second output comprising said first and said second components of said control signal, means for applying said first output to said transducing control means, and means for applying said second output to said record medium moving means.

* * * * *